Patented Oct. 12, 1937

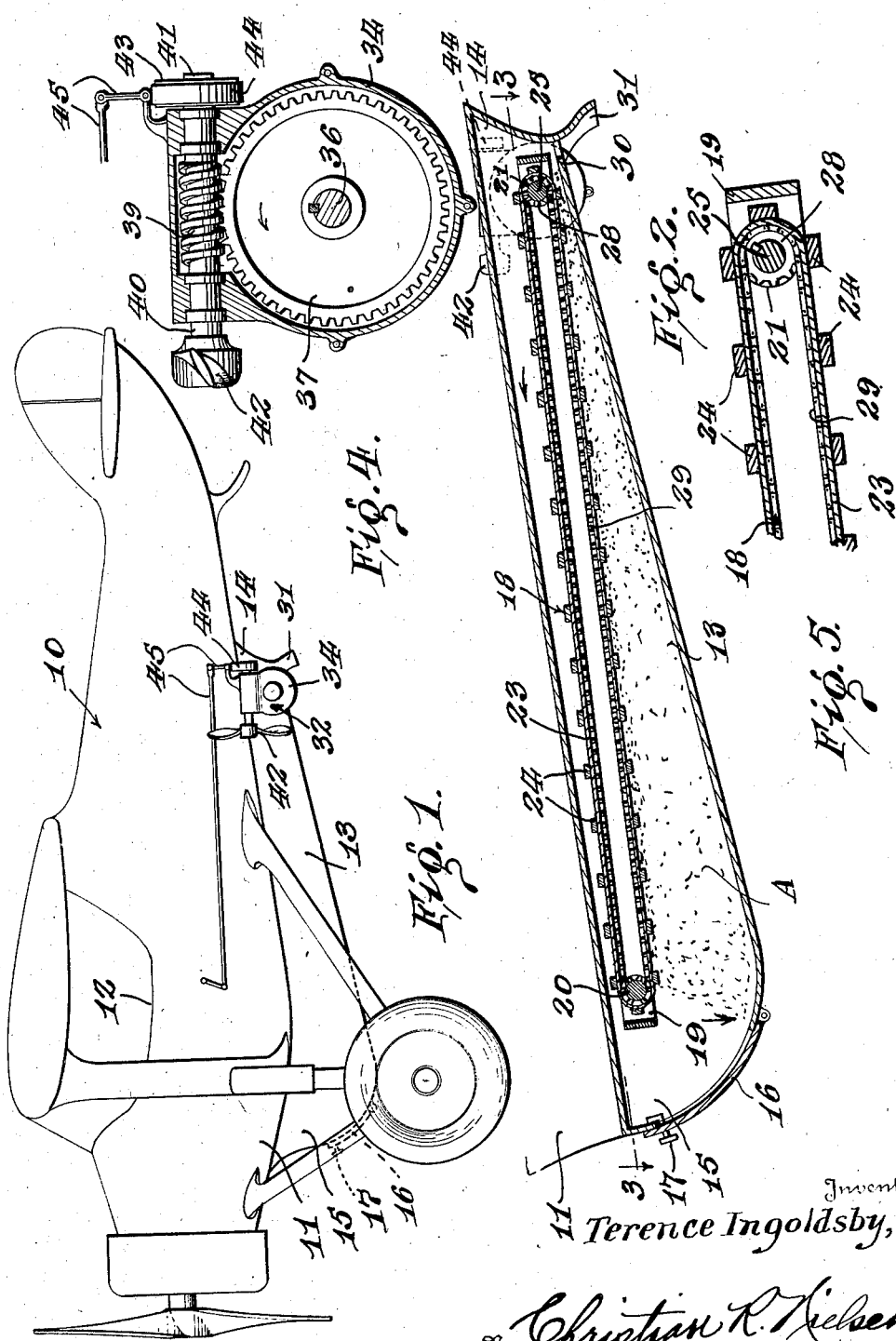

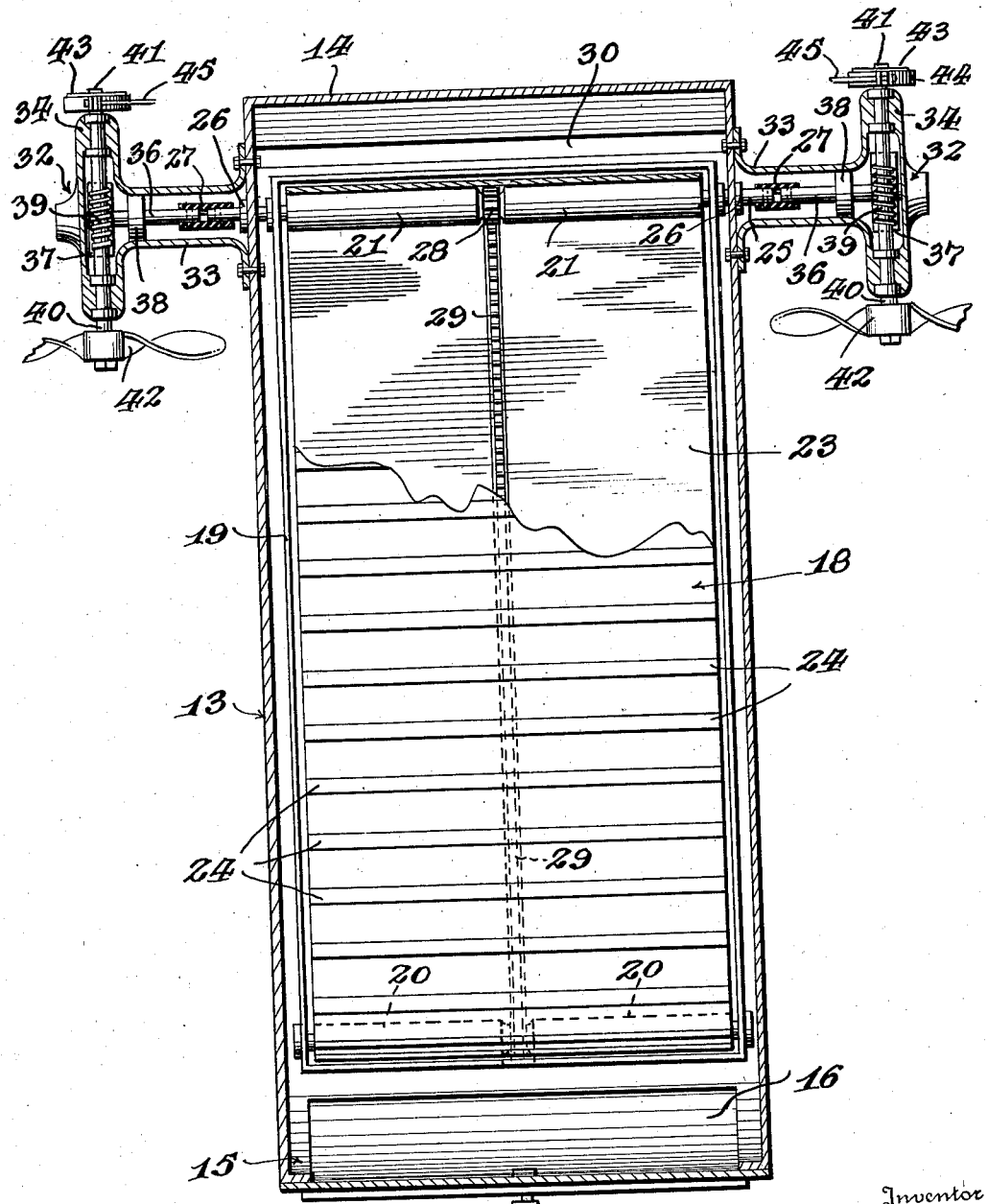

2,095,500

UNITED STATES PATENT OFFICE 2,095,500

POWDER DISTRIBUTOR FOR USE ON AIRCRAFT

Terence Ingoldsby, Lethbridge, Alberta, Canada

Application September 5, 1935, Serial No. 39,356

2 Claims. (Cl. 43—124)

My invention relates to powder distributors for use on aircraft, and it consists in the constructions, arrangements and combinations herein described and claimed.

It is an object of the invention to provide a distributor which will effectively distribute a powder substance, such as insecticide, or fire extinguishing compounds from an aircraft.

More particularly, the invention concerns a hopper which may be mounted on the craft and within which an endless conveyor is operatively mounted, driven by suitable propellers through the forward motion of the aircraft.

It is also an object of the invention to provide a conveyor having a novel mounting means, permitting the conveyor to adjust itself with respect to the material to be discharged.

It is a still further object of the invention to provide a deflector means at the discharge mouth of the hopper, insuring even distribution of material.

Additional objects, advantages and features of invention will be apparent from the following description considered in conjunction with the accompanying drawings, wherein Figure 1 is a side elevation of an airplane equipped with my invention.

Figure 2 is a longitudinal sectional view through the hopper.

Figure 3 is a section on the line 3—3 of Figure 2.

Figure 4 is a sectional view illustrating the drive for the conveyor.

Figure 5 is a detail of the drive between the conveyor chain and sprocket.

There is illustrated an aircraft 10, including a fuselage 11, and customary cockpit 12. Upon the underside of the fuselage 11 there is mounted in any approved manner, a hopper 13. The hopper 13 in the present instance is of a tapering formation, the reduced or apex portion 14 thereof being disposed toward the rear of the craft. The enlarged or forward portion 15 of the hopper 13 has formed therein a door 16, by means of which the powdered material is placed in the hopper. The door may include any suitable fastening means, as indicated at 17.

Extending longitudinally of the hopper 13, there is an endless conveyor 18. The conveyor 18 comprises a rectangular framework 19, of light construction, and extending transversely thereof, adjacent each end there are revolubly mounted rollers 20, and 21, and trained around these rollers there is a conveyor belt 23. The belt 23 may be formed of canvas or other suitable flexible material, and upon its outer face cleats 24 are secured.

The shaft 25 of the roller 21 projects beyond the sides of the frame 19, being suitably journalled as at 26, and upon respective projecting ends of the shaft a flexible coupling 27 is secured. The coupling in the present instance, is a flexible sleeve, although other means may obviously be employed.

The rollers 20—21 are divided intermediate their lengths, and at such points upon respective shafts of the rollers there is keyed a small sprocket wheel 28, about which a sprocket chain 29 is trained. Thus, the rollers 20—21 will be driven in unison, as will be explained more fully hereinafter. The sprocket chain 29 lies flush with the periphery of the rollers 20—21 and permits the conveyor belt 23 to snugly engage the rollers.

Immediately to the rear of the rollers 21, a discharge mouth 30 is formed in the underside of the hopper 13, and the reduced end 14 of the hopper terminates in a downwardly directed deflector plate 31, against which discharged material may strike for the purpose of breaking any lumpy particles, as well as securing a more even distribution of the material.

The drive for the conveyor will now be dealt with, and by way of illustration, the drive is shown as comprising a pair of propeller units 32, one being positioned upon opposite sides of the hopper. However, a single propeller unit may be found sufficient.

Inasmuch as the units are identical in construction, but one unit will be described. A sleeve housing 33 is suitably bolted to the side of the hopper, enclosing the shaft 25, and includes a concentric annular housing 34, within which there is revolubly mounted a shaft 36, upon which there is keyed a worm gear 37. The shaft 36 may be journalled in bearings 38 to provide a support and maintain the shaft in alignment with the shaft 25, and the coupling 27 to which it is suitably fixed.

A worm 39 is suitably journalled in the annular housing 34, and is in mesh with the teeth of the gear 37, the opposite ends 40, 41 of the shaft of the worm projecting beyond the housing 34. Upon the end 40 of the shaft a propeller 42 is fixed, and upon the end portion 41 there is secured a brake drum 43. Operatively associated with the drum 43 a brake band 44 is shown, the latter being actuated by grip and release of the drum through a link mechanism 45 which may be motivated through suitable means (not shown) in the cockpit 12.

It should be noted that the frame 19 is not attached to the sides of the hopper opposite the discharge mouth 30, but is free to partake of upward and downward movements, the shaft 25 serving as a pivot, and by reason of this construction the frame 19 will rest upon the material, indicated at A, and will follow its descent, as it is discharged by the conveyor. Therefore the conveyor will be in contact with the material at all times, regardless of the level or inclination of the aircraft, insuring positive distribution of material.

It will also be understood that the cleats 24 of the conveyor will have a pulverizing action on the material in its passage thereover, and this is an important factor in the successful operation of the device, since it has been found that due to atmospheric conditions, various insecticides have a tendency to become a lumpy or more or less solid mass.

*The operation*

The operation will be readily understood from the following description. The aircraft is flown at a suitable elevation, and when it is desired to begin distribution of the material, the leverage 45 is actuated to release the brake band 44, when the propellers 42 will be free to be driven by the forward motion of the craft. The rotation of the propellers will impart rotation to the worm 39 and to the shafts 25—36, by virtue of the worm gear 37, with consequent rotation of the conveyor 18, since the rollers 20—21 are interconnected through the sprocket wheels 28 and chain 29. If the distribution of material is to be stopped, for any reason, it is only necessary to actuate the leverage 45 to contract the brake band 44, stopping rotation of the propellers 42. It will therefore be apparent that distribution of material may be started or stopped, at will. As the material is discharged from the hopper the conveyor will follow downwardly thereabove, insuring engagement with the material, and the powder or other material discharged will be evenly distributed, clear of the craft through its engagement with the deflector 31.

The device has been successfully tested in the distribution of grasshopper bait, the craft having been flown at an altitude of about 100 feet, although this elevation will vary, depending upon the thickness of the spread, and other factors, as well as the power and size of the craft which would determine the width and power of the slipstream to spread the bait. While I have shown and described a certain preferred construction, it will be obvious that modifications may be made within the scope of the claims. As an illustration, clutch means for disconnecting the propellers 42 from the conveyor shaft may be employed instead of the brake band 44 and drum 43; and the ratio between the worm 39 and gear 37 may be varied to obtain the desired speed of distribution of material.

Also, the cleats may be altered or made of different materials and of different shape to tear or convey the material to the opening. The drive chain shown may in some instances, be insufficient to carry the load or may, if overloaded, cause warping of the conveyor. Consequently, for certain conditions, two or more chains may be necessary. Also in larger planes of the cabin or similar type, this device may be built to be placed within the cabin thereof.

I claim:—

1. A distributor for distributing substances from an aircraft comprising in combination with the craft a hopper mounted thereon having a discharge opening upon its under side, a transverse shaft mounted in one end of the hopper, a frame pivotally mounted at one end upon the shaft, a transverse shaft mounted in the frame, a roller mounted on each of the shafts, a sprocket wheel associated with each roller, a sprocket chain trained therearound, a conveyor belt trained about said rollers, a gear on one of the shafts, a gear in mesh therewith, propeller means for driving said last named gear, and means for controlling rotation of said shafts.

2. A distributor for distributing substances from an aircraft comprising in combination with the craft a hopper mounted thereon having a discharge opening upon its under side, a transverse shaft mounted in one end of the hopper, a frame pivotally mounted at one end upon the shaft, a transverse shaft mounted in the frame, a roller mounted on each of the shafts, a sprocket wheel associated with each roller, a sprocket chain trained therearound, a conveyor belt trained about said rollers, a gear upon the first named shaft, a housing fixed to the hopper, a shaft journalled therein in alignment with the first named shaft, a flexible coupling between said shafts, a propeller shaft journalled in the housing and extending exteriorly thereof, a gear on the shaft in mesh with the first named gear, a propeller carried by said propeller shaft, and means on said propeller shaft for controlling rotation of the first named shaft.

TERENCE INGOLDSBY.